United States Patent [19]

Castelbaum et al.

[11] Patent Number: 4,477,108
[45] Date of Patent: Oct. 16, 1984

[54] FLEXIBLE HOSE HAVING AN END CONNECTION FITTING

[75] Inventors: Leonard Castelbaum, Morrisville; Joseph M. Ostrowski, Fairless Hills, both of Pa.; Joseph H. Bedson, Jr., Lawrenceville, N.J.

[73] Assignee: Goodall Rubber Company, Trenton, N.J.

[21] Appl. No.: 378,840

[22] Filed: May 17, 1982

[51] Int. Cl.³ .............................................. F16L 39/02
[52] U.S. Cl. ..................................... 285/149; 285/294
[58] Field of Search ......................... 285/149, 294, 297

[56] References Cited

U.S. PATENT DOCUMENTS 1,562,954 11/1925 Goodall .............................. 285/149
2,940,778 6/1960 Kaiser ............................. 285/149 X
4,143,892 3/1979 Murphy et al. ..................... 285/149

FOREIGN PATENT DOCUMENTS 913421 12/1962 United Kingdom ................ 285/149
1595335 8/1981 United Kingdom ................ 285/297

Primary Examiner—Dave W. Arola
Attorney, Agent, or Firm—John F. A. Earley

[57] ABSTRACT

A flexible hose having an end connection fitting capable of withstanding high pressures and high end loads comprises a nipple having a stop ring on its outer periphery and a plurality of protruberances between the stop ring and the rear end of the nipple. A substantially tubular inner hose portion overlies the nipple, abuts the stop ring and extends away from the rear end of the nipple. A plurality of lays of spirally wound reinforcing wires overlie the inner portion of rubber and abut the stop ring. A sleeve overlies the nipple and is spaced therefrom. The inner periphery of the nipple has a roughened surface. A substantially tubular outer portion of an elastomer abuts the rear of the sleeve and overlies the reinforcing wires outside of the sleeve. A synthetic resin permeates the space between the wires and fills the space between the inner periphery of the sleeve and the inner portion of elastomer.

7 Claims, 5 Drawing Figures

FLEXIBLE HOSE HAVING AN END CONNECTION FITTING

TECHNICAL FIELD

This invention is in the field of flexible hose.

BACKGROUND OF THE PRIOR ART

It is known in the prior art to have a flexible hose of, for example, rubber in which a nipple inside the hose is opposed to a sleeve which is swaged onto the hose. It is also known to provide such a nipple with protuberances on its outer periphery to facilitate holding the connection between the nipple and the hose. In lieu of this arrangement, it is known to employ an outer sleeve overlying an end of the hose with the rubber overlying a reinforcing lay of spirally wound wires under the sleeve removed. A synthetic resin is used to fill the space between the sleeve and the inner rubber layer of the hose, the resin permeating the reinforcing wires. Despite this knowledge in the prior art, there has been a failure to develop a hose having an end connection fitting which has the capability of withstanding high pressures and high end loads without a separation occurring between the end fitting and the hose. This invention solves that problem.

BRIEF SUMMARY OF THE INVENTION

A flexible hose having an end connection fitting capable of withstanding high pressures and high end loads comprises a nipple having a stop ring on its outer periphery and a plurality of protuberances between the stop ring and the rear end of the nipple. A substantially tubular inner hose portion overlies the nipple, abuts the stop ring and extends away from the rear end of the nipple. A plurality of lays of spirally wound reinforcing wires overlie the inner portion of rubber and abut the stop ring. A sleeve has a front end flange abutting the front of the stop ring. The sleeve overlies the nipple and is spaced therefrom. The inner periphery of the sleeve has a roughened surface. A substantially tubular outer portion of an elastomer abuts the rear end of the sleeve and overlies the reinforcing wires outside of the sleeve. A synthetic resin permeates the space between the wires and fills the space between the inner periphery of the sleeve and the inner portion of elastomer.

DETAILED DESCRIPTION

Figure 1:
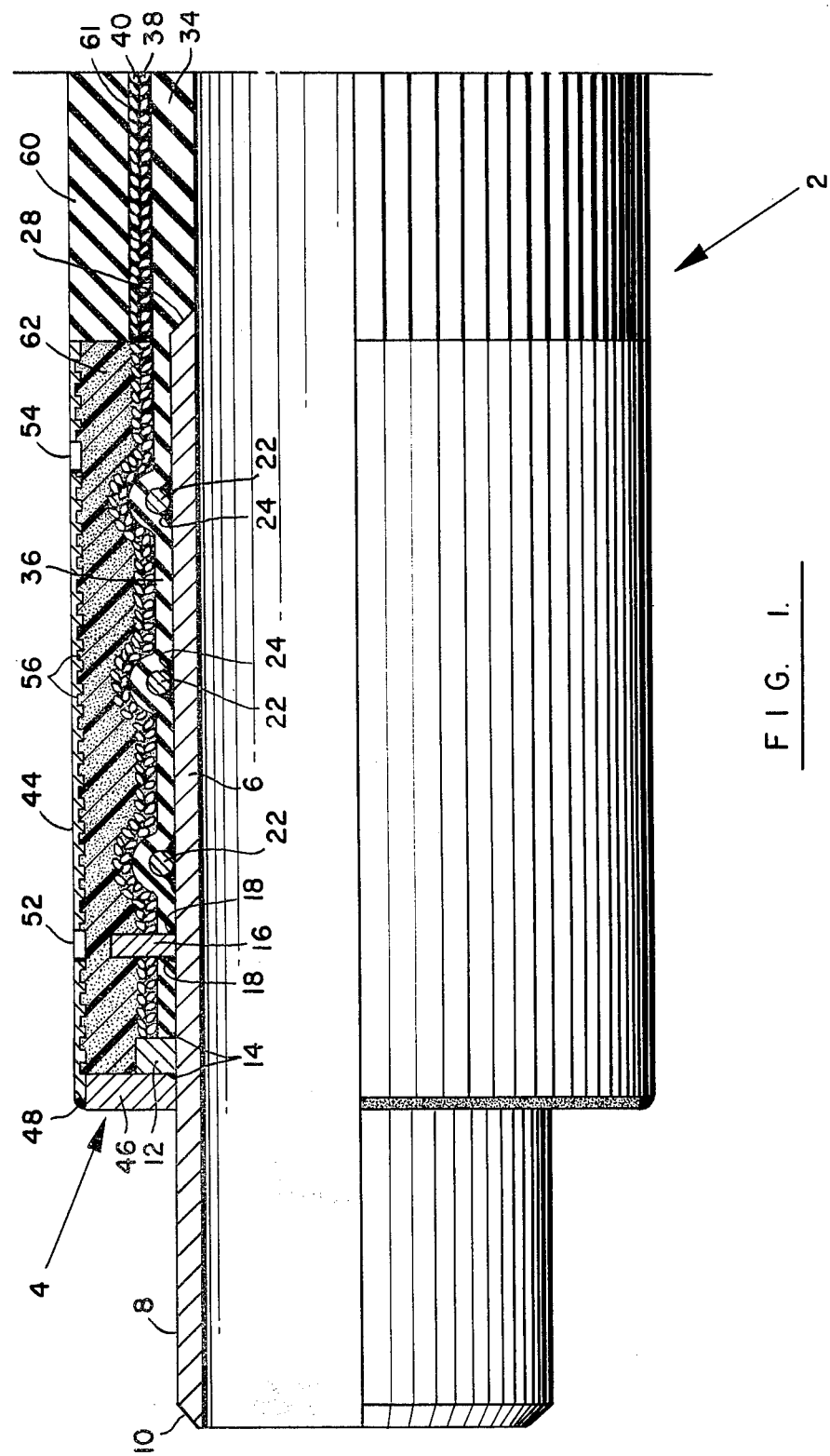
FIG. 1 is a side elevation of a hose having an end connection fitting in accordance with the invention.
Figure 2:
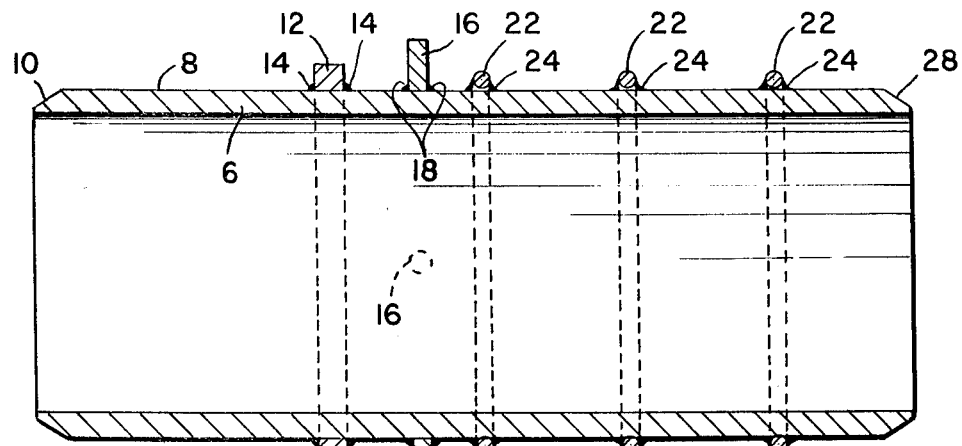
FIG. 2 is a vertical section through the nipple of the end connection fitting shown in FIG. 1.
Figure 3:
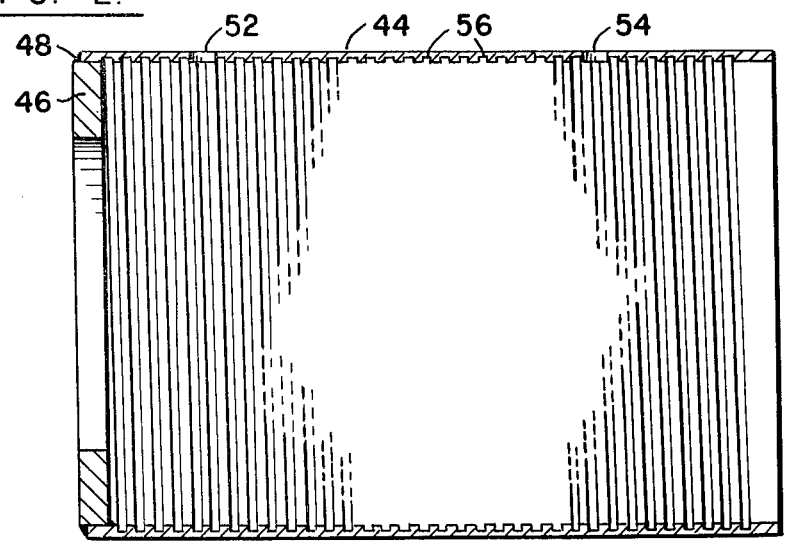
FIG. 3 is a vertical section through the sleeve of the end connection fitting of FIG. 1.
Figures 4, 5:
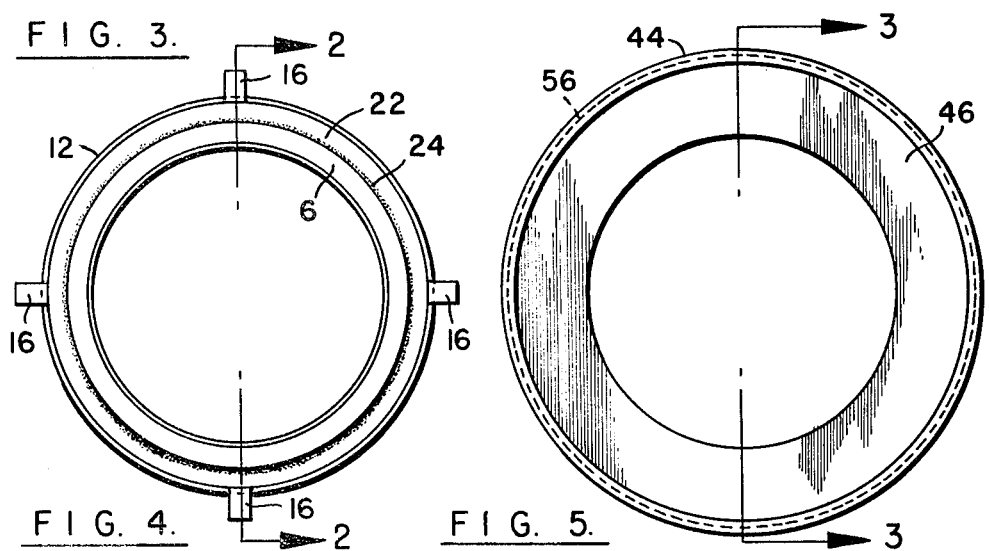
FIG. 4 is a rear view of the nipple of FIG. 2.
FIG. 5 is a rear end view of the sleeve of FIG. 3.

As shown in FIG. 1, a flexible hose 2 has an end connection fitting 4. End connection fitting 4 has a nipple 6 having an outer periphery 8. The front end is beveled as indicated at 10. A stop ring 12 is welded to outer periphery 8 as indicated at 14. A plurality of pins 16 (FIG. 4) are welded to outer periphery 8 as indicated at 18. Three peripheral rings 22, which are round in cross section, are welded as indicated at 24 to the outer periphery 8 of nipple 6. Nipple 6 has a beveled rear end 28.

A conventional substantially tubular inner portion 34 of an elastomer and elastomer impregnated fabric plys has a thinner wall portion 36 formed on nipple 6 around rings 22. The elastomer is, for example, rubber. Pins 16 extend through portion 36. Portion 36 abuts against stop ring 12. A lay 38 of spirally wound conventionally reinforcing wire overlies tubular portion 34 and a second lay 40 of spirally wound reinforcing wire wound in the opposite direction overlies the first lay 38.

A sleeve 44 having a front end flange 46 welded thereto at 48 overlies nipple 6 with flange 46 abutting against the front face of stop ring 12. Sleeve 44 has a pair of spaced openings 52 and 54 and has grooves 56 in its inner periphery to add a roughened surface.

A substantially tubular outer portion 60 of an elastomer such as rubber abuts the rear end of sleeve 44 and overlies the portion of lays 38 and 40 laying outside the sleeve 44, this portion of the lays of reinforcing wires having an elastomer 61 such as rubber therebetween.

A rigid binder 62 lies between the inner periphery of sleeve 44 filling grooves 56 and the outer periphery of portion 36 of tubular inner portion 34 and permeates the openings between wire lays 38 and 40. After the nipple 6, hose 2 and sleeve 44 have been assembled, the binder is in liquid form introduced through openings 54 in sleeve 44 while opening 52 acts as a vent and then hardened into a rigid mass.

The binder may be a synthetic resin, for example, an epoxy, polyurethane or acrylic resin. Other materials such as lead may be used.

In operation nipple 6 may be connected to a fitting as by welding or may be threaded thereto. It will be seen that any effort to separate the hose from the fitting will be strongly resisted by the interlocking of the stop ring 12 and flange 46 and the engagement of pins 16 with the inner portion 34 of the hose, the wire lays 38 and 40 and the synthetic resin 62 which fills grooves 56. Additionally rings 22 cause resistance to relative axial movement between the hose and the fitting aided by the binder 62 resisting outward movement of the inner portion of the hose and of the wire lays.

It will be understood that the above described embodiment is illustrative and not limiting.

We claim:

1. A flexible hose having an end connection fitting capable of withstanding high pressure and high end loads comprising:
    a nipple having a front end and a rear end, the front end being outside the hose and the rear end being inside the hose,
    said nipple having a stop ring attached to its radially outer periphery and a plurality of protrusions between the stop ring and the rear end of the nipple,
    said stop ring having a front face facing toward the front end of the nipple and a rear face facing toward the rear end of the nipple,
    a substantially tubular radially inner portion of the hose made of an elastomer overlying and in contact with the nipple, abutting the rear face of the stop ring and extending rearwardly away from the rear end of the nipple,
    a plurality of lays of spirally wound reinforcing wire overlying and in contact with said inner portion of the hose and abutting the rear face of the stop ring,
    said lays being part of the hose, a sleeve having a front end flange abutting the front face of the stop ring, said sleeve overlying said nipple, spaced from the nipple and having a roughened radially inner surface, said sleeve having a front end facing toward the front end of the nipple and a rear end facing toward the rear end of the nipple, a substantially tubular radially outer portion of the hose made of an elastomer abutting the rear end of the sleeve and overlying the reinforcing wire outside of the sleeve, and a rigid binder permeating the space between the wires and lying between and in contact with the radially inner periphery of the sleeve and the inner portion of the hose, whereby the connection fitting is firmly attached to the hose by the inner portion of the hose engaging the nipple, by the plurality of lays of spirally wound reinforcing wire pressing toward the plurality of protrusions on the nipple, by the chemical bonds obtained between the binder and the reinforcing wire and the binder and the sleeve, by the binder surrounding at least part of the protrusions of the nipple, and by the front end flange of the sleeve abutting the front face of the stop ring.

2. A flexible hose in accordance with claim 1 in which the protrusions comprise a plurality of spaced pins.

3. A flexible hose in accordance with claim 1 in which the protrusions comprise spaced peripheral rings.

4. A flexible hose in accordance with claim 1 in which said roughened radially inner surface of the sleeve comprises peripheral grooves.

5. A flexible hose in accordance with claim 1, 2, 3 or 4 in which the rigid binder is a synthetic resin.

6. A flexible hose in accordance with claim 5 in which the resin is an epoxy resin.

7. A flexible hose having an end connection fitting capable of withstanding high pressure and end loads comprising:

a nipple having a front end and a rear end, the front end being outside the hose and the rear end being inside the hose, said nipple having a stop ring attached to its radially outer periphery, a plurality of protrusions including a plurality of pins perpendicular to its radially outer periphery and attached thereto and a plurality of rings secured to its radially outer periphery, said pins and rings lying between the stop ring and the rear end of the nipple, said stop ring having a front face facing toward the front end of the nipple and a rear face facing toward the rear end of the nipple, a substantially tubular radially inner portion of the hose made of an elastomer overlying and in contact with the nipple, abutting the rear face of the stop ring and extending rearwardly away from the rear end of the nipple, a plurality of lays of spirally wound reinforcing wires overlying and in contact with said inner portion of the hose and abutting the rear face of the stop ring, said lays being part of the hose, a sleeve overlying and spaced from the nipple and having a front end flange abutting the front face of the stop ring, said sleeve having peripheral grooves in its radially inner surface, said sleeve having a front end facing toward the front end of the nipple and a rear end facing toward the rear end of the nipple, a substantially tubular radially outer portion of the hose made of an elastomer abutting the rear end of the sleeve and overlying the reinforcing wires outside of the sleeve, and a synthetic resin permeating the space between the wires and lying between and in contact with the radially inner periphery of the sleeve and the inner portion of the hose, whereby the connection fitting is firmly attached to the hose by the inner portion of the hose engaging the nipple, by the plurality of lays of spirally wound reinforcing wire pressing toward the plurality of pins and rings on the nipple, by the chemical bonds obtained between the binder and the reinforcing wire and the binder and the sleeve, by the binder surrounding at least part of the protrusions of the nipple, and by the front end flange of the sleeve abutting the front fact of the stop ring.

* * * * *